United States Patent [19]

David

[11] Patent Number: 5,605,635
[45] Date of Patent: Feb. 25, 1997

[54] METHOD OF PURIFYING GASEOUS OR LIQUID EFFLUENTS CONTAINING SULFUR DERIVATIVES

[76] Inventor: Philippe-Marie David, 15 Le Clos Saint Jean, 27150 Le Thil en Vexin, France

[21] Appl. No.: 398,381

[22] Filed: Mar. 3, 1995

[51] Int. Cl.⁶ .................................................. C02F 1/20
[52] U.S. Cl. .................... 210/750; 210/755; 210/758; 210/916; 422/5; 423/226; 423/242.2; 423/243.01
[58] Field of Search ............................. 423/226, 242.2, 423/242.3, 243.01, 245.1, 245.2; 422/5; 210/721, 725, 749, 750, 755, 758, 916

[56] References Cited

U.S. PATENT DOCUMENTS

| | | | |
|---|---|---|---|
| Re. 31,236 | 5/1983 | Saitoh et al. | 423/242.3 |
| 4,022,605 | 5/1977 | Konya et al. | 71/67 |
| 4,417,986 | 11/1983 | Connaught et al. | 210/916 |
| 4,647,577 | 3/1987 | Umekawa et al. | 210/755 |
| 4,874,530 | 10/1989 | Kobayashi et al. | 210/916 |
| 4,909,925 | 3/1990 | Hodgson et al. | 423/242.2 |

FOREIGN PATENT DOCUMENTS

| | | | |
|---|---|---|---|
| 52-18484 | 2/1977 | Japan | 423/242.3 |

*Primary Examiner*—Peter A. Hruskoci
*Attorney, Agent, or Firm*—Bell, Seltzer, Park & Gibson

[57] ABSTRACT

Process for purifying gaseous or liquid effluents containing sulphur-containing derivatives ($H_2S$, alkyl mercaptans, $SO_2$).

This process comprises: (i) basification of the effluent to be treated at a pH >9 in the presence of a base of general formula M—OH, in which M represents an alkali metal, an alkaline-earth metal, an agent for condensation between the organic part of the compound of formula I below and the sulphur-containing derivative or a phase transfer agent and especially a quaternary ammonium or a ligand; (ii) placing of the product obtained in (i) in contact with a compound of general formula I: X—$(CH_2)_n$—CO—R, in which: X represents: a halogen, a sulphonyl halide of formula X'—$SO_2$—R', in which X' represents a halogen and R' represents a $C_1$–$C_{20}$ alkyl group or an optionally substituted aryl group, an OH group; R represents: a $C_1$–$C_{16}$ alkoxy, a group NH—R", in which R" represents a hydrogen atom or a primary or secondary amine radical, a group $OR_2$ in which $R_2$ represents a hydrogen atom, an alkali metal, an alkaline-earth metal or an ammonium group, or a halogen; n is an integer between 1 and 4, at a temperature between 12° C. and 95° C. and at atmospheric pressure.

4 Claims, No Drawings

METHOD OF PURIFYING GASEOUS OR LIQUID EFFLUENTS CONTAINING SULFUR DERIVATIVES

The present invention relates to a process for purifying gaseous or liquid effluents containing sulphur-containing derivatives ($H_2S$, alkyl mercaptans, $SO_2$).

Hydrogen sulphide is an extremely toxic and corrosive gas with an unpleasant smell even when it is present in very low amounts.

Its presence, as well as that of alkyl mercaptans which have the same drawbacks as $H_2S$ from an olfactory point of view, in effluents (gaseous or liquid effluents), particularly industrial effluents, represent a considerable threat to the health of living organisms or of the plant environment. It is thus of the utmost importance in pollution control to remove the hydrogen sulphide and the alkyl mercaptans present in industrial effluents (energy- and chemistry-related industries, wood, paper and viscose industries, and agrifood industries), in waste (animal by-products industries, animal waste and domestic waste) or in purification plants.

The presence of $SO_2$ in effluents, particularly industrial effluents, also represents a considerable threat to the plant environment; indeed, its emission is responsible for an increase in acidity in the atmosphere and gives rise to acid rain.

The industries producing $SO_2$ are especially refineries, hydrocarbon waste treatment industries, energy-related industries, the chemical industries (inorganic chemistry: production of sulphuric acid and of titanium oxide; organic chemistry), the paper industries, the agrifood industries and materials industries.

Various solutions have been proposed to remove these various sulphur-containing compounds from the effluents (gaseous or liquid effluents):

A. $H_2S$ and/or alkyl mercaptans:

The solutions currently adopted in the industry fall within the following categories:

incineration of pollutant gases (thermal combustion in ovens or catalytic combustion). This solution has numerous drawbacks:

sulphurous gas is produced, the olfactory nuisance is not entirely destroyed, the energy cost is very high, the combustion by torchère (petrochemistry) additionally requires a system of neutralization by precipitation as the iron chelate;

adsorption of the mercaptans or of $H_2S$ by transfer of the product to be removed from the gaseous phase to a solid phase (active charcoal, optionally impregnated with aldehyde); this process is dangerous (vigorous heating-up and fire risks) and does not enable the saturated charcoal to be recycled;

biodeodorization is achieved:

either by bio-washing, in which the $H_2S$ or the mercaptans are extracted with water, comprising purifying microorganisms, or by biofiltration, in which the microorganisms are present on the material through which the gas to be purified passes.

This process has the drawback of leading to metabolization co-products and to a production of biomass and requires installations of considerable volume (complex maintenance);

washing of the pollutant gases by various solutions:

solutions of sodium hydroxide or of amine: this purification process has the drawback of requiring a high energy consumption on account of the limited efficiency of the transfer of material and of the need to regenerate the sodium hydroxide or amine solutions; in addition, acidic gases are recovered, which are burned off, thereby giving rise to emission of sulphurous gases, solutions comprising an oxidizing agent (oxidation of $H_2S$ or of mercaptans in the presence of chlorine, aqueous hydrogen peroxide solution, ozone or ferric ions in particular):

chlorine and derivatives thereof:

Chlorine may be employed either in the form of gaseous or nascent chlorine or in the form of sodium hypochlorite or sodium chlorite.

This results either in the formation of hypochlorous acid: HClO, or in the formation of chlorine dioxide: $ClO_2$.

It should be noted that, depending on the working pH, sodium chlorite may generate very irritant and suffocating gaseous emanations of chlorine dioxide which also present fire hazards.

Nascent chlorine may be formed by electrochlorination of a solution of sodium hypochlorite or sodium chloride brine.

The reactions which are cited in the literature convert the $H_2S$ either into colloidal sulphur or into sulphates:

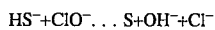

Waltrip F. (J.W.P.C.F., 1985, 57, (10), 1027–1032) mentions that the first reaction takes place below pH 10 whereas Cadena F. and Peters R. W., (J.W.P.C.F., 1988, 60, (7), 1259–1263) place the boundary at pH 7.5. Recent works by Bonnin C. show that the two reactions are superposed, the second being favoured by an increase in the pH.

In order to arrive at the sulphate stage, the theoretical consumption of chlorine is 4 mol of $Cl_2$ per mole of $H_2S$. In practice, in order to obtain an elimination yield greater than 99.8% and a virtually total conversion into sulphate, the consumption of chlorine is 5.2 mol per mole of $H_2S$ destroyed and a sodium hydroxide consumption of about 5 mol/mole.

The action of chlorine on methyl mercaptan is more complex. The first oxidation product is dimethyl disulphide ($CH_3$—S—S—$CH_3$), which is itself very odorous and which must undergo a final oxidation to methanesulphonic acid ($CH_3$—$SO_3H$). In order to remove this type of sulphur-containing compound, the use of an excess of oxidizing agent is necessary. The elimination yields are of the order of 85 to 95% using excess chlorine at pH>10. The chlorine and sodium hydroxide consumptions are high (8.5 and 7.6 mol/mole of $CH_3SH$ eliminated respectively).

ozone:

During its use for washing and oxidation, it is necessary to transfer it into the liquid phase, either by means of a hydro-injector in the liquid before the washing operation, or during a second step in which it oxidizes the mercaptan or the $H_2S$ absorbed.

In aqueous medium, $H_2S$ is oxidized by ozone mainly in the form of sulphate. The pH is between 9 and 11, the ozone consumptions range between 0.8 and 3 mol of oxidizing agent/mole of $H_2S$ (effects of auto-decomposition and of free-radical inhibitors).

For the mercaptans, the pH should be increased (maximum ionization) and salt effects should be taken into account.

aqueous hydrogen peroxide solution:

The action of aqueous hydrogen peroxide solution on mercaptans and hydrogen sulphide has formed the subject of numerous publications, among which are the following patents: U.S. Pat. No. 3,966,450 (O'Neil and Kibbel, 1976); U.S. Pat. No. 4,151,260 (Woertz, 1979); patent DE 34 12581 A1 (Mehl, 1985).

A study carried out by Le Goallec et al., 1990, shows an overall consumption of 12 mol of $H_2O_2$/mole of $H_2S$ destroyed, whereas the theoretical consumption is 4 mol/mole and that in the laboratory, when less oxidized intermediate species formed are taken into account, the instantaneous consumption is only 2 mol/mole. The use of aqueous hydrogen peroxide solution to purify a medium of $H_2S$ often results in the formation of strong alliaceous odours.

ferric chelate:

Processes which use a ferric chelate make it possible to obtain elemental sulphur directly from the acidic gases, such that there is no secondary pollution, and these processes remove the odour of hydrogen sulphide satisfactorily but may require restricting conditions (pressures higher than atmospheric pressure, elevated temperatures).

The above-mentioned washing methods have the major drawback of producing substitution products which are themselves pollutant (certain salts, oxidizing agents).

B. $SO_2$:

The solutions currently adopted in the industry fall within the following categories:

reduction of the $SO_2$ emissions at source:
  by modification of the processes used, especially incineration (moist catalysis on active charcoal, treatment of the fuel),
  by injection of desulphurizing agent into the furnace,
  by treatment of the flue gases:
  washing of the gases with hydrated lime,
  semi-dry process (spraying of a milk of lime),
  dry process (injection of powdered lime),
uptake of $SO_2$ by sodium hydroxide.

The methods for purifying $SO_2$ have, in particular, the drawback of resulting in the formation of products which may lead to a harmful acidification of the environment.

The object set for the present invention was to provide a process for purifying gaseous or liquid effluents containing one or more sulphur-containing derivatives, such as $H_2S$, mercaptans or $SO_2$, which eliminates the drawbacks of the solutions with the same intended object which are proposed in the prior art, especially in that the process according to the present invention allows a quantitative yield of the order of 100%, does not require a specific installation (possible use of any gas-washing column for example), and gives a stable, biodegradable and non-toxic substitution product.

The subject of the present invention is a process for purifying effluents (gaseous or liquid effluents) containing sulphur-containing derivatives ($H_2S$, alkyl mercaptans, $SO_2$), characterized in that it comprises:

(i) basification of the effluent to be treated at a pH>9 in the presence of a base of general formula M—OH, in which M represents an alkali metal, an alkaline-earth metal, an agent for condensation between the organic part of the compound of formula I below and the sulphur-containing derivative or a phase transfer agent and especially a quaternary ammonium or a ligand;

(ii) placing of the product obtained in (i) in contact with a compound of general formula I:

$$X—(CH_2)_n—CO—R,$$

in which:

X represents:

a halogen, a sulphonyl halide of formula X'—$SO_2$—R', in which X' represents a halogen and R' represents a $C_1$-$C_{20}$ alkyl group or an optionally substituted aryl group, an OH group, R represents:

a $C_1$-$C_{16}$ alkoxy, a group NH—R", in which R" represents a hydrogen atom or a primary or secondary amine radical, a group $OR_2$ in which $R_2$ represents a hydrogen atom, an alkali metal, an alkaline-earth metal or an ammonium group, or a halogen, n is an integer between 1 and 4, at a temperature between 12° C. and 95° C. and at atmospheric pressure.

The principle of the chemical reaction may, in the case where R represents $OR_2$, be represented schematically as follows:

case of a mercaptan (reaction a):

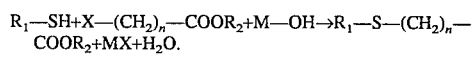

$$R_1—SH+X—(CH_2)_n—COOR_2+M—OH \rightarrow R_1—S—(CH_2)_n—COOR_2+MX+H_2O.$$

case of hydrogen sulphide (reaction b:)

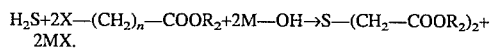

$$H_2S+2X—(CH_2)_n—COOR_2+2M—OH \rightarrow S—(CH_2—COOR_2)_2+2MX.$$

case of sulphur dioxide (reaction c):

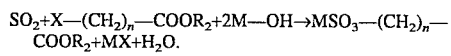

$$SO_2+X—(CH_2)_n—COOR_2+2M—OH \rightarrow MSO_3—(CH_2)_n—COOR_2+MX+H_2O.$$

$R_1$ represents $C_nH_m$ hydrocarbon radicals such as methyl, ethyl, butyl, etc., X and $R_2$ have the same meaning as above.

According to an advantageous embodiment of the said process, steps (i) and (ii) are performed simultaneously.

According to another advantageous embodiment of the said process, in the compound of formula I, X represents chlorine, R represents a group $OR_2$ and n represents 1.

According to a preferred arrangement of this embodiment, $OR_2$ is an ONa group.

Sodium monochloroacetate is then obtained as the product of formula I.

In the case where M=Na; X=Cl; $R_2$=Na, the above reactions a, b and c become:

mercaptan:

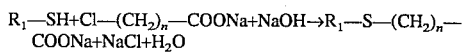

$$R_1—SH+Cl—(CH_2)_n—COONa+NaOH \rightarrow R_1—S—(CH_2)_n—COONa+NaCl+H_2O$$

$H_2S$:

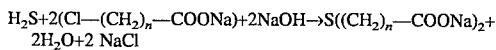

$$H_2S+2(Cl—(CH_2)_n—COONa)+2NaOH \rightarrow S((CH_2)_n—COONa)_2+2H_2O+2\ NaCl$$

$SO_2$:

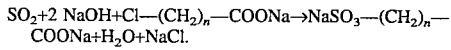

$$SO_2+2\ NaOH+Cl—(CH_2)_n—COONa \rightarrow NaSO_3—(CH_2)_n—COONa+H_2O+NaCl.$$

This process for the uptake and depollution of gaseous or liquid sulphur-containing effluents also applies to the simultaneous treatment of several sulphur-containing derivatives, which are optionally combined with acidic gases.

The process in accordance with the invention requires no special equipment.

Usually, washers are used in series; the treatment of a mixture of pollutants takes place in 2 or 3 steps in series; usually, an acidic treatment stage to remove the nitrogen-containing compounds, followed by an oxidizing basic treatment or an oxidizing treatment stage followed by a basic treatment.

The number of washing stages or the type of column will be determined in consequence.

The process in accordance with the invention makes it possible to obtain an absolutely odourless and colourless liquid treated product which may be discharged directly towards an auto-neutralization tank of a purification plant; furthermore, the acidification does not regenerate mercaptans or hydrogen sulphide.

The biological treatment at the purification plant also does not give rise to any new nuisances, either regarding the purification system or the plant itself. The BOD (Biological Oxygen Demand) and COD (Chemical Oxygen Demand) measurements are improved when compared with the conventional oxidative destruction processes.

Besides the preceding arrangements, the invention also comprises other arrangements, which will emerge from the description which follows, which refers to examples of implementation of the process which is the subject of the present invention.

It should, however, be understood that these examples are given purely by way of illustration of the subject of the invention, of which they in no way constitute a limitation.

EXAMPLE 1

Uptake and Destruction of Pure Methyl Mercaptan

A destruction column (height 2 m, cross section 180) filled with Raschig rings is fed in countercurrent with a solution consisting of:

water: 400 liters,

40% soda lye: 40 liters (d=1.33), sodium monochloroacetate: 45 kg.

16.5 kg of methyl mercaptan, derived from a chemical reaction, were taken up on the column over a period of 2 h at a temperature between 12° and 35° C. At the end of the uptake, the production reactor and the column are purged with nitrogen (flow rate of 200 l/h) for 10 h.

EXAMPLE 2

Uptake and Destruction of Dilute Methyl Mercaptan by Nitrogen

The same amounts of reactants as in Example 1 are used. The methyl mercaptan is taken up over 6 h under a stream of nitrogen at a flow rate of 3,000 l/h, under the same conditions as those of Example 1 (temperature and pressure).

The flow rate of the gases is:

nitrogen : 3,000 l/h (86%)

$CH_3SH$ : 460 l/h (13%).

The apparatus is then purged with nitrogen for 8 h (flow rate of 200 l/h).

EXAMPLE 3

Uptake and Destruction of Pure Hydrogen Sulphide

The same column as in Example 1 is fed with a solution consisting of:

water: 450 liters,

40% soda lye: 80 liters, sodium monochloroacetate: 85 kg.

5.88 kg of hydrogen sulphide, derived from a chemical reaction, were taken up over a period of 5 h between 18° and 25° C., and the apparatus is then purged with nitrogen (flow rate of 200 l/h) for 12 hours.

The liquid effluents obtained in Examples 1–3 (substitution products) are totally odourless and confirm the yield of 100% for the process in accordance with the invention. The substitution products of Examples 1–2 were combined and then discharged towards an auto-neutralization tank of a purification plant. They were then subjected to a bacteriological treatment in this plant. Daily monitoring by sampling of the biological aeration tank was carried out over 10 days; the absence of volatile sulphide emissions is noted.

EXAMPLE 4

Uptake and Destruction of Methyl Mercaptan in a Stirred Open Container

A solution of 100 ml of water to which are added 9 g (0.225 mol) of pure sodium hydroxide flakes is prepared in a first 250 ml conical flask fitted with a magnetic stirrer, followed by introduction of 25 g (0.215 mol) of sodium monochloroacetate. 10 g (0.208 mol) of methyl mercaptan are sparged into this reaction medium over 30 min via a submerged tube.

At the end of the reaction, the reaction medium is odourless, by production of a substitution product of the type $R_1$—S—$(CH_2)_n$—$COOR_2$.

EXAMPLE 5

Destruction of Sodium Methyl Mercaptate in Alkaline Aqeuous Solution

A solution of 100 ml of water to which are added 9 g (0.225 mol) of pure sodium hydroxide flakes is prepared in a 250 ml conical flask fitted with a magnetic stirrer, followed by sparging with 10 g of methyl mercaptan (0.208 mol). 25 g (0.215 mol) of sodium monochloroacetate are introduced into this reaction medium over a few minutes.

After the addition, the reaction medium is odourless.

EXAMPLE 6

Destruction of Captured Hydrogen Sulphide in Alkaline Aqueous Solution

A solution of 18 g of sodium hydroxide flakes (0.45 mol) in 100 ml of water is prepared in a 250 ml conical flask fitted with a magnetic stirrer. 7 g (0.208 mol) of hydrogen sulphide are sparged into this solution via a submerged tube.

50 g of sodium monochloroacetate (0.43 mol) are added to this solution of sodium sulphide in a single portion. The temperature rises very rapidly from 35° to 80° C.

After the addition, the reaction medium is odourless.

EXAMPLE 7

Uptake and Destruction of a Dilute Methyl Mercaptan/Hydrogen Sulphide Mixture in Air A stream of air at a flow rate of 45 m³/hour containing 20 mg H₂S and 10 mg CH₃SH per m³ is passed in countercurrent through a washing column (h=2m, diameter=150) fed with a solution of 80 l of water containing 2 l of soda lye and 0.8 kg of sodium monochloroacetate with a flow rate of 500 l/h.

After purifying for 2 h, in accordance with the process according to the invention, the solution obtained is odourless.

EXAMPLE 8

Uptake and Destruction of Dilute SO₂ in Air

The same washing column as that of Example 7 is used, and is fed with a solution of 70 l of water containing 2 l of soda lye and 1 kg of sodium monochloroacetate with a flow rate of 500 l/h. A countercurrent stream of 45 m³/h of air containing 1,200 ppm of SO₂ is passed through over a period of 3 h. The solution obtained is odourless.

EXAMPLE 9

Uptake and Destruction of Pure SO₂

35 g of sodium monochloroacetate are introduced in a single portion into a 250 ml conical flask fitted with a magnetic stirrer and containing a solution consisting of 6.4 g of SO₂ in 100 ml of water and 25 ml of 40% soda lye. The temperature rises very rapidly from 20° to 40° C.

After the addition, the reaction medium is odourless. In addition, no emission of SO₂ is observed on acidification of the sample.

In all of the reactions (Examples 1 to 9), a quantitative yield of 100% is obtained (complete elimination of the effluents).

As emerges from the preceding account, the invention is in no way limited to those modes of implementation, of production and of application thereof which have just been described in greater detail; on the contrary, it encompasses all the variants which may occur to a person skilled in the art, without departing from the context or the scope of the present invention.

I claim:

1. A process for purifying gaseous or liquid effluents containing a sulphur-containing derivative, comprising the steps of:

(i) basification of the effluent to be treated at a pH>9 in the presence of a base;

(ii) reacting the product obtained in (i) with a compound of general formula I:

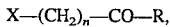

in which,

X represents:

a halogen, a sulphonyl halide of formula X'—SO₂—R', in which X' represents a halogen and R' represents a $C_1$–$C_{20}$ alkyl group or an optionally substituted aryl group, an OH group, R represents:

a $C_1$–$C_{16}$ alkoxy, a group NH—R", in which R" represents a hydrogen atom or a primary or secondary amine radical, a group $OR_2$ in which $R_2$ represents a hydrogen atom, an alkali metal, an alkaline-earth metal or an ammonium group, or a halogen, n is an integer between 1 and 4, at a temperature between 12° C. and 95° C. and at atmospheric pressure.

2. Process for purifying effluents according to claim 1, wherein steps (i) and (ii) are performed simultaneously.

3. Process for purifying effluents according to claim 1 or claim 2, wherein in the compound of formula I, X represents chlorine, R represents a group $OR_2$ and n represents 1.

4. Process for purifying effluents according to claim 3, wherein $OR_2$ is an ONa group.

* * * * *